(No Model.)
W. H. BRISTOL.
TEMPERATURE COMPENSATING DEVICE.
No. 514,258. Patented Feb. 6, 1894.
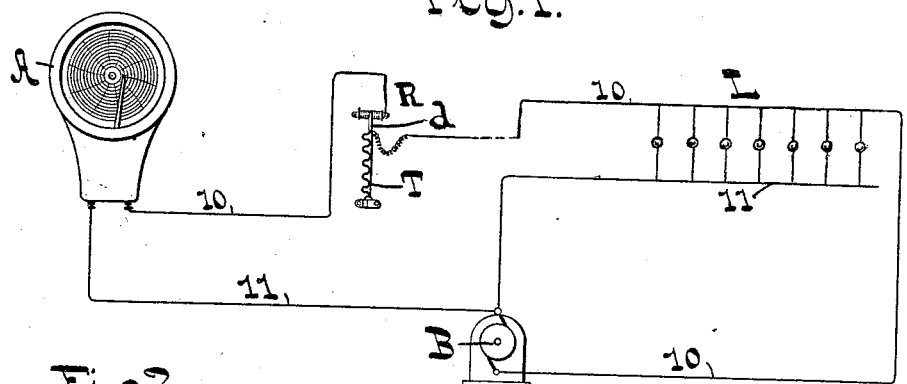
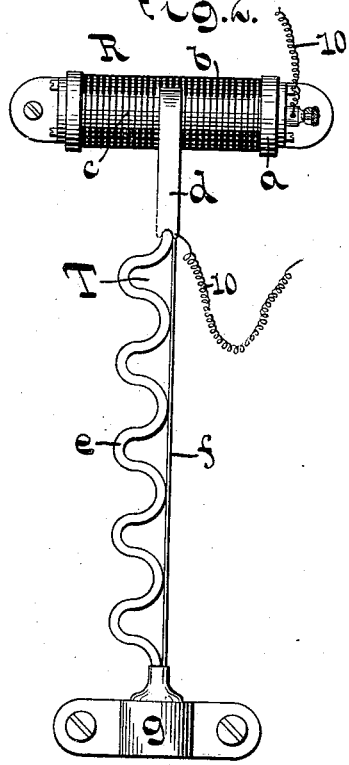
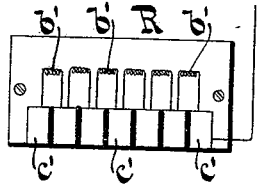
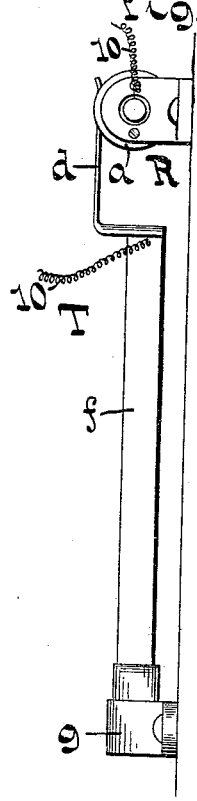
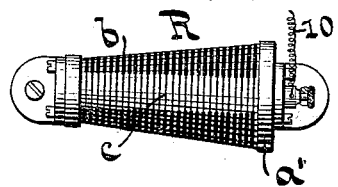
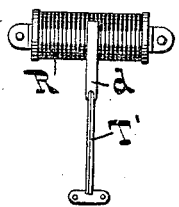
WITNESSES:
INVENTOR:
William H. Bristol,
BY
ATTORNEY

UNITED STATES PATENT OFFICE.

WILLIAM H. BRISTOL, OF HOBOKEN, NEW JERSEY.

TEMPERATURE-COMPENSATING DEVICE.

SPECIFICATION forming part of Letters Patent No. 514,258, dated February 6, 1894.

Application filed October 31, 1893. Serial No. 489,640. (No model.)

*To all whom it may concern:*

Be it known that I, WILLIAM H. BRISTOL, a citizen of the United States of America, and a resident of Hoboken, in the county of Hudson and State of New Jersey, have invented a certain new and useful Improvement in Temperature-Compensating Devices, of which the following is a specification.

My invention has reference to electric indicating or recording instruments and especially to a device for compensating for the differences in resistance caused by variations in atmospheric temperature.

In carrying out my invention I combine with the electric indicating or recording instrument, a resistance interpolated in the circuit through which the current to be measured passes, and a thermometric device adapted to automatically maintain said resistance constant under variations in temperature by varying the effective length of the resistance wire in the circuit with the temperature.

The nature of my said invention will best be understood when described in connection with the accompanying drawings, in which—

Figure 1 represents diagrammatically the parts of an instrument (recording voltmeter) embodying my invention, and connections with a source of electricity. Fig. 2 is a front elevation of the compensating device. Fig. 3 is a side elevation of Fig. 2. Figs. 4 and 5 illustrate modified forms of the resistance coil or box. Fig. 6 is a front elevation of a modified form of thermometer.

Similar letters and figures of reference designate corresponding parts throughout the several views of the drawings.

Referring to Fig. 1 of the drawings, the letter B designates a dynamo including lamps L in its circuit 10—11; and A is an electric recording instrument, say a voltmeter, interpolated in the circuit.

R is the resistance having a movable contact piece $d$, and T is the thermometer connected with and actuating the piece $d$. Resistance R and contact $d$ are interpolated in wire 10, and conjointly with the thermometer form the temperature compensating device by causing the effective length of the resistance wire to vary with the temperature of the surrounding atmosphere.

I will now proceed to describe in detail the construction of the compensating device here shown.

Referring to Figs. 2 and 3, the resistance R is formed of a spool $a$ having a coil $b$ of closely wound insulated wire thereon,—part of the wire insulation however being removed, or omitted, at the periphery to form an exposed surface $c$ with which the metallic spring or contact-piece $d$ is in contact. The thermometer T for actuating the contact-piece $d$ is formed of a flat metallic tube $e$ closed at both ends and bent into approximately sinusoidal shape, the same being filled with alcohol or other suitable fluid. A flat flexible strip $f$ of the same metal, or one which has the same coefficient of expansion, is laid upon and secured to the sinusoidal tube at a number of points. The tube is secured at one end to a suitable base $g$. A tube of this construction permits multiplying devices for obtaining sufficient motion to be dispensed with, and, therefore the contact piece $d$ can be secured, by solder or otherwise, directly to the free end of the tube. An increase of temperature will cause this tube to be deflected to the right and vice versa. The resistance of the wires of the instrument increasing with the temperature, the current is caused to enter the coil $b$ at the right hand, consequently the effective length of the resistance wire, in view of the contact piece $d$ moving over the exposed wire, is decreased with an increase of temperature and vice-versa; and consequently the resistance in maintained constant. Assuming that an error in the indication of the instrument is one-half of one per cent. for a change in temperature of 10° Fahrenheit, the coil is so proportioned that the resistance wire thrown in or out is sufficient to compensate for the error. The shape of the coil, in general, should be such as to correspond to the law of change due to temperature, or any other law in special instruments.

In Fig. 4, I have shown the wire wound on a taper spool $a'$ so that the resistance thrown in or out increases or decreases in variable proportions.

In Fig. 5 I have shown a resistance made somewhat similar to the ordinary resistance box, it consisting of contact plates $c'$ insulated from each other, to which wire coils $b'$ are respectively connected. These coils may individually offer equal, or unequal resistance, as may be required.

In general the construction of the resistance devices and the thermometer may be varied, or other forms substituted as may be found desirable or necessary,—therefore I do not wish to restrict myself to any of the particular forms shown. For the thermometer shown may be substituted any known form of thermometer of such nature as to adapt it to move a contact piece, such for instance, as the metallic thermometer T' shown in Fig. 6, the same being made of strips of metals having different coefficients of expansion, such for instance as steel and brass.

What I claim as new is—

1. An electrical temperature compensating device, consisting of a resistance, and a thermometric device automatically maintaining the resistance constant under variations in temperature, substantially as described.

2. The combination with an electrical instrument, of a movable contact for varying the length of the resistance wire in the circuit, and a thermometer in operative connection with said contact, substantially as described.

3. The combination with a resistance, of a thermometer, and a metallic device secured to said thermometer and arranged in contact with the resistance for varying the length of the resistance wire, substantially as described.

4. The combination with the resistance spool R of insulated wire having an exposed surface $c$, of a thermometer, and a contact operated by said thermometer and engaging the exposed surface, substantially as described.

In testimony that I claim the foregoing as my invention I have signed my name, in presence of two witnesses, this 25th day of October, 1893.

WILLIAM H. BRISTOL.

Witnesses:
KLAS H. TERNSTEDT,
J. J. MALLE.